US009323429B2

(12) United States Patent
Lu et al.

(10) Patent No.: US 9,323,429 B2
(45) Date of Patent: Apr. 26, 2016

(54) INTERACTIVE VIRTUAL DISPLAY SYSTEM

(71) Applicant: Microsoft Technology Licensing, LLC, Redmond, WA (US)

(72) Inventors: Yan Lu, Beijing (CN); Wen Sun, Beijing (CN); Shipeng Li, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 19 days.

(21) Appl. No.: 14/063,106

(22) Filed: Oct. 25, 2013

(65) Prior Publication Data

US 2014/0053090 A1    Feb. 20, 2014

Related U.S. Application Data

(63) Continuation of application No. 13/094,725, filed on Apr. 26, 2011, now Pat. No. 8,594,467, which is a continuation-in-part of application No. 12/340,410, filed on Dec. 19, 2008, now Pat. No. 8,180,165, and a continuation-in-part of application No. 12/408,611, filed on Mar. 20, 2009, now Pat. No. 8,254,704.

(51) Int. Cl.

| | |
|---|---|
| *G06F 3/00* | (2006.01) |
| *G06F 3/0484* | (2013.01) |
| *G06F 3/01* | (2006.01) |
| *G06F 3/0346* | (2013.01) |
| *G06F 3/041* | (2006.01) |
| *G06F 3/042* | (2006.01) |
| *G06F 3/14* | (2006.01) |
| *H04N 19/176* | (2014.01) |

(Continued)

(52) U.S. Cl.
CPC .............. *G06F 3/0484* (2013.01); *G06F 3/017* (2013.01); *G06F 3/0346* (2013.01); *G06F 3/041* (2013.01); *G06F 3/0425* (2013.01); *G06F 3/1454* (2013.01); *H04N 19/132* (2014.11); *H04N 19/17* (2014.11); *H04N 19/176* (2014.11); *H04N 19/60* (2014.11); *G06F 2203/0331* (2013.01); *G09G 5/14* (2013.01); *G09G 2340/02* (2013.01); *G09G 2350/00* (2013.01); *G09G 2370/20* (2013.01)

(58) Field of Classification Search
CPC ... H04N 19/132; H04N 19/17; H04N 19/176; H04N 19/60; G06F 3/017; G06F 3/041; G06F 3/011; G06F 19/3406; G06F 19/3481; G06F 2203/0331; G06F 3/0304; G06F 3/0483; G06F 3/0484; G06F 3/0488
See application file for complete search history.

(56) References Cited

U.S. PATENT DOCUMENTS 5,913,727 A * 6/1999 Ahdoot ........................... 463/39
8,200,796 B1 * 6/2012 Margulis ...................... 709/223

(Continued)

*Primary Examiner* — Jingge Wu
(74) *Attorney, Agent, or Firm* — Cassandra T. Swain; Danielle Johnston Holmes; Micky Minhas

(57) ABSTRACT

An "Interactive Virtual Display," as described herein, provides various systems and techniques that facilitate ubiquitous user interaction with both local and remote heterogeneous computing devices. More specifically, the Interactive Virtual Display uses various combinations of small-size programmable hardware and portable or wearable sensors to enable any display surface (e.g., computer display devices, televisions, projected images/video from projection devices, etc.) to act as a thin client for users to interact with a plurality heterogeneous computing devices regardless of where those devices are located relative to the user. The Interactive Virtual Display provides a flexible system architecture that enables communication and collaboration between a plurality of both local and remote heterogeneous computing devices. This communication and collaboration enables a variety of techniques, such as adaptive screen compression, user interface virtualization, real-time gesture detection to improve system performance and overall user experience, etc.

20 Claims, 6 Drawing Sheets

Exemplary Framework for "Host" and "Agent" Components of the Interactive Virtual Display

(51) Int. Cl.
*H04N 19/60* (2014.01)
*H04N 19/132* (2014.01)
*H04N 19/17* (2014.01)
*G09G 5/14* (2006.01)

(56) References Cited

U.S. PATENT DOCUMENTS

| | | |
|---|---|---|
| 2005/0060759 A1* | 3/2005 | Rowe et al. .................. 725/143 |
| 2009/0146951 A1* | 6/2009 | Welland ........................ 345/158 |
| 2010/0074321 A1* | 3/2010 | Beaudreau ............... 375/240.01 |
| 2010/0306772 A1* | 12/2010 | Arnold et al. ..................... 718/1 |
| 2010/0329358 A1* | 12/2010 | Zhang et al. ............ 375/240.26 |
| 2011/0004827 A1* | 1/2011 | Doerr et al. .................... 715/735 |
| 2011/0072349 A1* | 3/2011 | Catanese et al. .............. 715/719 |
| 2011/0209064 A1* | 8/2011 | Jorgensen et al. ............ 715/733 |
| 2012/0064971 A1* | 3/2012 | Devine et al. .................... 463/31 |
| 2012/0124509 A1* | 5/2012 | Matsuda et al. .............. 715/782 |
| 2012/0188279 A1* | 7/2012 | Demaine ........................ 345/633 |

\* cited by examiner

INTERACTIVE VIRTUAL DISPLAY SYSTEM

CROSS-REFERENCE TO RELATED APPLICATIONS

This application is a Continuation application of U.S. patent application Ser. No. 13/094,725, filed on Apr. 26, 2011 by Yan Lu, et al., and entitled "Interactive Virtual Display System for Ubiquitous Devices," and claims priority to U.S. patent application Ser. No. 13/094,725 and all parent applications and issued patents under Title 35 U.S.C., §120. Further, U.S. patent application Ser. No. 13/094,725 is a Continuation-in-Part of a prior application entitled "GPU Accelerated Screen Codec" which was filed Dec. 19, 2008 and assigned U.S. patent application Ser. No. 12/340,410, now U.S. Pat. No. 8,180,165, the subject matter of which is incorporated herein by this reference, and claims priority to U.S. Pat. No. 8,180,165 under Title 35 U.S.C., §120. Finally, U.S. patent application Ser. No. 13/094,725 is also a Continuation-in-Part of a prior application entitled "Remote Computing Platforms Providing High-Fidelity Display and Interactivity for Clients" which was filed Mar. 20, 2009 and assigned U.S. patent application Ser. No. 12/408,611, now U.S. Pat. No. 8,254,704, the subject matter of which is incorporated herein by this reference, and claims priority to U.S. Pat. No. 8,254,704 under Title 35 U.S.C., §120.

TECHNICAL FIELD

An "Interactive Virtual Display," as described herein, is an interactive system that provides various ubiquitous user interaction techniques that enable user access and control of remote heterogeneous computing devices from any local display surface.

BACKGROUND

Rapid developments in computing and communication technologies are bringing fundamental changes to multimedia applications as well as multimedia systems. On the one hand, remote servers and the "cloud" integrate large amounts of computing and storage resources. Note that the term "cloud" is generally understood to refer to cloud computing environments, such as the Internet, that provide a supplement, consumption, and delivery model for IT services based on Internet protocols, and it typically involves provisioning of dynamically scalable and often virtualized resources. By leveraging such resources in view of increasingly higher available user bandwidth, multimedia systems are able to deliver rich multimedia content to client devices, interactively or even in real-time. On the other hand, client devices continue to become more and more diverse in terms of functionalities and capabilities. The number of client devices each user owns is also tending to increase over time. Consequently, when designing multimedia systems, both the adaptation of heterogeneous computing devices and potential collaboration between such devices should be considered to provide a better user experience.

Conventional virtual display techniques are a good example of device collaboration, in which the computing is distributed among local clients and remote instances. Typically, most computations for these virtual display techniques are carried out remotely utilizing remote computing resources, and only high-level or low-level drawing primitives are transmitted to the local clients. Local clients then use these drawing primitives to render the final display on the client device. In general, these types of virtual display architectures are very suitable for thin-client computing systems where the local client and the remote instance communicate via a point-to-point connection. Consequently, such architectures have been widely adopted to support various multimedia applications.

Unfortunately, traditional virtual display architectures are not well suited to meet many of the new requirements raised by the increasing popularity and availability of heterogeneous computing devices. For example, heterogeneous computing devices, such as workstations, desktop PCs, laptops, and a wide variety of handheld or mobile devices, make different trade-offs between mobility, display capability, and user input mechanism. Therefore, such devices provide different user experiences based on those trade-offs. In general, small-size devices that can be taken anywhere, such as mobile phones, are widely adopted by users. However, given their generally relatively small size, these portable devices often suffer from compromised display area and inefficient user input capabilities. In contrast, dedicated IO resources, such as large displays, touch screens, projection devices, etc., are usually dedicated to particular devices with poor mobility (e.g., such devices are too large, too heavy, and require too much power to carry in the user's pocket or purse.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Further, while certain disadvantages of prior technologies may be noted or discussed herein, the claimed subject matter is not intended to be limited to implementations that may solve or address any or all of the disadvantages of those prior technologies.

Given the increasing number of heterogeneous computing devices that each person owns or has access to, efficient management and control of such devices in a way that provides high mobility, advanced display capabilities, and convenient user input is a meaningful consideration. In fact, it has recently been estimated that by the year 2020, the world will have about 15 billion devices with mobile capabilities, with this number not including other computing devices owned by or accessible to users. In general, an "Interactive Virtual Display," as described herein, provides various techniques that facilitate ubiquitous user interaction with one or more local and remote heterogeneous computing devices, including, but not limited to hand-held or mobile computing devices, audio or video media players, eReaders, communications devices such as cell phones and PDA's, workstations, desktop PCs, laptops, netbooks, multiprocessor systems, microprocessor-based systems, set top boxes, consumer electronics, mini-computers, mainframe computers, etc.

More specifically, the Interactive Virtual Display uses various combinations of small-size programmable hardware (e.g., small portable computing and communications platforms, including, but not limited to, OMAP3x type hardware) and portable or wearable motion sensors or other input devices to enable any display surface (e.g., computer display devices, televisions, projected images/video from projection devices, etc.) to act as a thin client that allows users to interact with a variety of local and remote heterogeneous computing devices. This functionality is enabled by various techniques that provide a flexible system architecture that enables communication and collaboration between a plurality of both local and remote devices. Further, the communication and collaboration capabilities of the Interactive Virtual Display enable a variety of features, such as adaptive screen compression, user interface virtualization, and real-time gesture detection to improve system performance and overall user experience.

The portable hardware component (e.g., OMAP3x type platforms) of the Interactive Virtual Display is referred to herein as a "display interface module". This display interface module provides basic computing, storage, and networking capabilities, while the portable or wearable sensors capture the user's finger or hand gestures to trigger user input events. Note that these input events can also be captured using conventional devices such as keyboards, pointing devices, 2D or 3D cameras, speech input techniques, laser detection devices (e.g., virtual keyboards), etc. Consequently, this functionality, when combined with a thin client, allows the user to remotely access and control multiple heterogeneous computing devices, either individually, concurrently, or in combination.

In other words, considering the ubiquitous presence of the display surfaces as well as the good mobility of the display interface module and wearable sensors (or other input devices) of the Interactive Virtual Display, the user can not only view the visual contents of any of his remote devices anytime and anywhere, but also directly operate these devices in situ on whatever ubiquitous display surfaces happen to be available (and that are connected to the display interface module). Advantageously, such functionality largely facilitates the daily use of digital devices, and enables unprecedented user experiences by combining advanced display technologies, natural user input mechanisms, and remote high-performance computing resources.

In view of the above summary, it is clear that the Interactive Virtual Display described herein provides an interactive virtual display system that provides various ubiquitous user interaction techniques that enable user access and control of a wide variety of heterogeneous computing devices from any local display surface, regardless of where those devices may be relative to the user. In addition to the just described benefits, other advantages of the Interactive Virtual Display will become apparent from the detailed description that follows hereinafter when taken in conjunction with the accompanying drawing figures.

DESCRIPTION OF THE DRAWINGS

The specific features, aspects, and advantages of the claimed subject matter will become better understood with regard to the following description, appended claims, and accompanying drawings where:

DETAILED DESCRIPTION OF THE EMBODIMENTS

Figure 1:
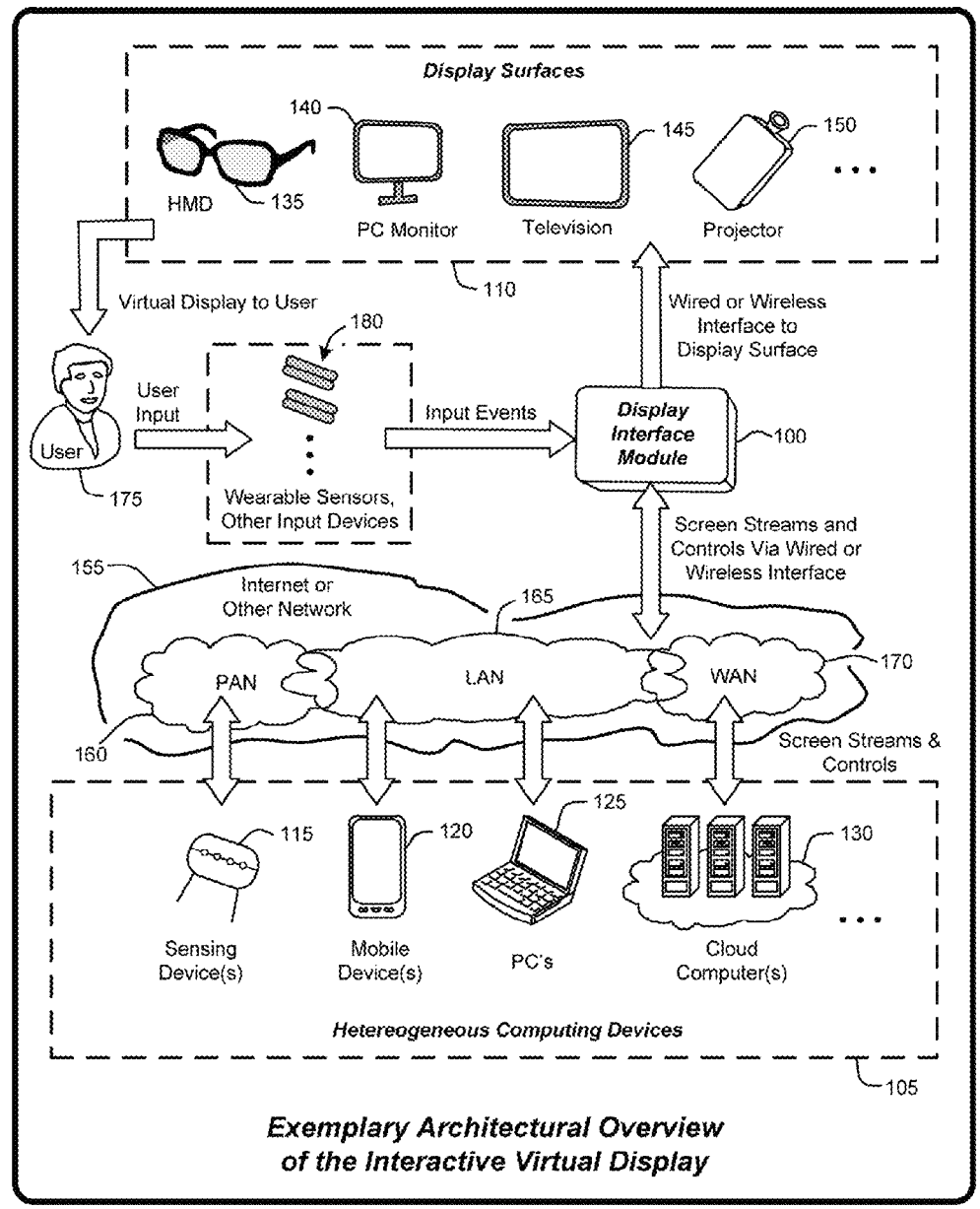
FIG. 1 illustrates a general architectural diagram that provides an overview of an "Interactive Virtual Display," as described herein.

In the following description of the embodiments of the claimed subject matter, reference is made to the accompanying drawings, which form a part hereof, and in which is shown by way of illustration specific embodiments in which the claimed subject matter may be practiced. It should be understood that other embodiments may be utilized and structural changes may be made without departing from the scope of the presently claimed subject matter.

1.0 Introduction:

As discussed in detail herein, an "Interactive Virtual Display" provides various mechanisms for decoupling display resources and user input mechanisms from the underlying hosting machine, thereby allowing such resources to be shared by multiple heterogeneous computing devices that are distributed in local and/or wide areas. Examples of such heterogeneous computing devices, include, but are not limited to, hand-held or mobile computing devices, audio or video media players, eReaders, communications devices such as cell phones and PDA's, workstations, desktop PCs, laptops, netbooks, multiprocessor systems, microprocessor-based systems, set top boxes, programmable consumer electronics, network PCs, minicomputers, mainframe computers, etc.

Surfaces with display capabilities (e.g., computer display devices, televisions, projected images/video from projection devices, head-mounted displays, etc.), referred to herein as either "display surfaces" or "ubiquitous displays", are becoming ubiquitous in people's living and working places. Therefore, it would be highly advantageous to allow the user to access and control various heterogeneous computing devices through any available display surface, regardless of where those devices are in relation to the user. Such functionality, as enabled by the Interactive Virtual Display, allows the user to manage, interact with, and control multiple heterogeneous computing devices remotely as a virtual machine from any place where an available display surface exists. This capability is referred to herein as "ubiquitous user interaction."

More specifically, the Interactive Virtual Display uses various combinations of small-size programmable hardware (referred to herein as a "display interface module") and wearable sensors (or other input devices) to enable any display surface to act as a thin client that allows users to interact with a variety of local and remote heterogeneous computing devices. This functionality is enabled by various techniques that provide a flexible system architecture that enables communication and collaboration between a plurality of both local and remote devices. Further, the communication and collaboration capabilities of the Interactive Virtual Display enable a variety of features, such as adaptive screen compression, user interface virtualization, and real-time gesture detection to improve system performance and overall user experience.

In other words, a display that could be shown on a display device connected directly to a local or remote heterogeneous computing device is instead provided on the display surface connected to the display interface module. Note that the display from a particular heterogeneous computing device is referred to as a "virtual display" when provided on the display surface connected to the display interface module. Further, it should also be noted that multiple "virtual displays", corresponding to different heterogeneous computing devices, can be provided concurrently (in separate windows) on a single display surface such that the user can interact with (or switch between) any heterogeneous computing device she chooses.

Further, in various embodiments, rather than just provide the video output of a particular heterogeneous computing device in a window on the display surface, a virtual representation of the remote heterogeneous computing device can be provided as an interactive virtual device along with a corresponding display. For example, assume that the remote computing device is a PDA having a display screen and a plurality of control buttons and the like. In this case, the Interactive Virtual Display can provide an image of that PDA with user accessible virtual buttons or controls that can be selected or operated by the user. In this example, interaction with and control of the virtual PDA (or other device) displayed on the display surface will allow the user to interact with and control the remote PDA, while the virtual representation of that PDA responds in the same manner as the remote PDA (see discussion of FIG. 2, below, for an example of this embodiment). Note that in this case, a separate software driver or various DLLs along with virtual images of the heterogeneous computing device will be required for each different heterogeneous computing device.

More specifically, the Interactive Virtual Display provides a virtual display system that facilitates a variety of ubiquitous user interaction scenarios. In fact, the Interactive Virtual Display allows any display surface with common wired or wireless interfaces to be augmented to become a thin client, by leveraging small portable computing and communications platforms, such as, but not limited to, OMAP3x type hardware, smartphones, etc., to construct the display interface module, in combination with one or more portable and/or wearable motion sensors or other input devices.

The display interface module component of the Interactive Virtual Display provides modular and extensible communications and computations platforms in a very small portable form factor format that includes capabilities such as, for example, an integral OS and video output combined with various wired and/or wireless networking and interface capabilities. Examples of common wired interfaces used by the Interactive Virtual Display include, but are not limited to DVI, HDMI, VGA, Ethernet, IEEE 1394, USB, etc., while wireless interfaces include, but are not limited to common radio frequency interfaces, such as, for example, Bluetooth®, various 802.11x standards, and various mobile phone network technologies such as GSM, CDMA, LTE, WiMAX, etc. In other words, the display interface module provides basic computing, storage, and networking capabilities along with one or outputs for connecting to various display devices and one or more inputs for receiving user input data (from wearable sensors or other input devices).

The portable or wearable sensors capture the user's finger or hand gestures to trigger user input events. Note that these input events can also be captured using conventional devices such as physical or virtual keyboards, pointing devices, speech input techniques, 2D or 3D cameras, etc. Further, various video capture techniques can also be used to track motions or gestures of the user's hand or fingers (or other body parts) to trigger various user input events (e.g., pointer or cursor movements or selection actions, data input, etc.). Note that while there are a large variety of techniques for receiving user input, the following discussion will generally refer to the use of wearable motion sensors (e.g., accelerometers) for tracking or capturing user motions or gestures for user input purposes. However, it should be clear that user input embodiments of the Interactive Virtual Display are not intended to be limited to the wearable sensors described herein.

In general, the wearable sensors act as input devices to supply a touchscreen-like local user input mechanism, regardless of the capabilities of the display device being used by the Interactive Virtual Display. In fact, any display surface or display device can be augmented with a portable display interface module, provided as one component of the Interactive Virtual Display, to yield a thin client with good mobility, through which users can efficiently leverage the local display capability and remote computing resources from various ubiquitous display devices. Under the flexible system architecture for cross-device communication and collaboration provided by the Interactive Virtual Display, several techniques, such as adaptive screen compression, user interface virtualization, and real-time gesture detection are provided to improve the system performance and user experience. IN other words, in various embodiments, the display interface module changes an appearance of the composite display by emulating visual effects and control actions corresponding to touch-screen type inputs in response to corresponding user inputs received from one or more wearable sensors.

The following paragraphs provide several high-level definitions that are used throughout this document in describing the implementation and functionality of the ubiquitous user interaction provided by the Interactive Virtual Display:

A "ubiquitous display" is defined as a "display surface" or display device (e.g., television sets, PC monitors, projector screens, display wads, head-mounted displays, etc.) that typically does not include computing and storage capabilities (though such devices are often connected to heterogeneous computing devices having such capabilities). In fact, most ubiquitous displays can only display raw video signals when connected to hosting machines via short-range high speed interfaces (e.g., VGA, DVI, HDMI, etc.). In various embodiments, the display interface module makes use of these interfaces for connecting the ubiquitous display to the overall system provided by the Interactive Virtual Display. Note also that depending upon the capability of the ubiquitous display, various embodiments of the display interface module component of the Interactive Virtual Display can connect to those displays using various wired or wireless techniques or interfaces. In various embodiments, the Interactive Virtual Display provides a ubiquitous interaction solution that enables any such ubiquitous display to display visual contents of one or more remote machines or heterogeneous computing devices.

A "ubiquitous input" is defined as a user input mechanism that supports the ubiquitous interaction with ubiquitous displays. Ubiquitous displays vary widely in size, resolution and usage. Further, most ubiquitous displays do not natively support user input. Therefore, in various embodiments, the Interactive Virtual Display provides a ubiquitous input solution that enables any such ubiquitous display to provide the user with a visual user interface for interacting with one or more remote machines or heterogeneous computing devices.

A "virtual user interface" is defined as an interface having the capability to smartly merge various UIs (associated with a variety of different operating systems, devices, or applications). In general, heterogeneous computing devices or machines have different user interfaces (UI) for local operations, tailored for specific display surfaces and input methods. Consequently, in various embodiments, the Interactive Virtual Display provides ubiquitous user interaction via a virtual user interface that merges various UIs to provide a seamless user experience among heterogeneous computing devices.

In general, in various embodiments discussed throughout this document, the Interactive Virtual Display provides or enables a variety of advantageous features and techniques, not all of which are required for implementing particular embodiments. These various features and techniques include, but are not limited to:

An interactive visual display system, in which a small-size programmable hardware having a conventional video output interface (VGA, DVI, HDMI, etc.) or high-speed wireless interface can be connected to any available display surface or device to augment that "ubiquitous display" into a thin client with moderate computing and networking functions. This small-size programmable hardware is generally referred to herein as the aforementioned "display interface module". Note that in various embodiments, this display interface module is implemented as either a standalone device, or is integrated into other devices, such as, for example, a cell phone or other handheld computing device.

The resulting augmented thin client can concurrently connect to one or more remote heterogeneous computing devices (e.g., cloud servers, PCs, mobile devices, etc.) for remote display.

One or more wearable motion sensors can be attached to user's hands or fingers to support touch-screen-like user interaction (either single-point touch or multiple-point touch) with the remote heterogeneous computing devices via the ubiquitous display.

Any instance of an "Interactive Virtual Display agent" (or simply "agent") can connect to one or more instances of an "Interactive Virtual Display host" (or simply "host"), while each connection (agent and hosts) can be responsible to update one or more "screen fragments" (i.e., a portion of the overall display corresponding to a particular heterogeneous computing device, as discussed in further detail below). The agent then uses the screen fragments provided by the various hosts to compose the final display (also referred to as a "composite display") on the ubiquitous display, via either 2D or 3D rendering. Note that these screen fragments are scaled to fit the size and/or resolution of the display surface being used. Further, note that typically, the agent is deployed on the display interface module that is connected to the ubiquitous display. In contrast, a separate instance of the host is deployed on each remote heterogeneous computing device, and is responsible for sending screen image sequences of the corresponding device for constructing the local virtual display viewed by the user and also for receiving input events for device control in response to inputs from one or more agents.

Adaptive screen compression and transmission is achieved in various embodiments by leveraging display screen composition information of the Interactive Virtual Display host and agents, including occlusion, scaling, and focus, where some particular regions in the screen fragments can be skipped, pre-processed, and prioritized during the compression and transmission.

Interactive region of interest (ROI) control is provided in various embodiments by using client-driven screen encoding and transmission adaptation, which dynamically monitors the user's input at the client side (i.e., local user input received by the display interface module) and automatically generates the proper size and position for the ROI to be displayed on the ubiquitous display. Note also that the ROI may be scaled as a function of bandwidth, as discussed in further detail herein.

In various embodiments, a star-topology interconnection architecture and/or a tree-topology interconnection architecture are used to achieve the final display (also referred to as the "virtual user interface") composition. In the star topology, the centric node, i.e., the display interface module which runs the agent, directly connects (wired or wireless) to all the remote devices running instances of the host, and composes the virtual display via its local graphical functions (e.g., OpenGL ES API, etc.). As discussed in further detail herein, in the tree topology, some remote devices can run both the host and the agent, to inherit the remote devices' user interfaces (e.g., Microsoft® Surface®).

With respect to wearable sensors, in various embodiments, a single-accelerometer pointing scheme is used to simulate mouse events, thereby allowing users to interact with the ubiquitous display surfaces when wearing a single accelerometer on their finger. In other words, in such embodiments, a pointer on the screen will move in response to user finger or hand movement in the same way as if the user were moving a mouse or other pointing device. Note that similar functionality can also be provided by using optical finger or hand tracking methods (e.g., cameras, lasers, etc.).

With respect to wearable sensors, in various embodiments, a multi-accelerometer multi-touch scheme is used to simulate a multi-touch screen type user interaction for the ubiquitous display surfaces when the user wears two or more accelerometers on different fingers or hands. Again, similar functionality can also be provided by using optical finger or hand tracking methods (e.g., cameras, lasers, etc.).

1.1 System Overview:

As noted above, the "Interactive Virtual Display" provides an interactive virtual display system that provides various ubiquitous user interaction techniques that enable user access and control of remote heterogeneous computing devices from any local display surface, regardless of where those devices are located relative to the user. The processes summarized above are illustrated by the general system diagram of FIG. 1. In particular, the system diagram of FIG. 1 illustrates the interrelationships between program modules for implementing various embodiments of the Interactive Virtual Display, as described herein. Furthermore, while the system diagram of FIG. 1 illustrates a high-level view of various embodiments of the Interactive Virtual Display, FIG. 1 is not intended to provide an exhaustive or complete illustration of every possible embodiment of the Interactive Virtual Display as described throughout this document.

In addition, it should be noted that any boxes and interconnections between boxes that may be represented by broken or dashed lines in FIG. 1 represent alternate embodiments of the Interactive Virtual Display described herein, and that any or all of these alternate embodiments, as described below, may be used in combination with other alternate embodiments that are described throughout this document.

In general, as illustrated by FIG. 1, the processes enabled by the Interactive Virtual Display begin operation by connecting a "display interface module" 100 to a display surface 110 via a conventional wired or wireless interface. Examples of display surfaces 110 include, but are not limited to, head mounted displays (HMD) 135 (e.g., video glasses or the like), PC monitors 140, televisions 145, projectors 150, etc.

In addition, the display interface module 100 is also in communication with one or more heterogeneous computing devices 105 via a wired or wireless connection to the Internet or other network 155. In general, the Interactive Virtual Display is capable of being implemented across virtually any conventional wired or wireless network, including personal area networks (PAN) 160, local area networks (LAN) 165, wide area networks (WAN) 170, etc., using any desired network topology (e.g., star, tree, etc.). Examples of heterogeneous computing devices 105 include, but are not limited to sensing devices 115 (e.g., cameras, smoke detectors, microphones, alarm systems, etc.) mobile devices 120 (e.g., cell phones, PDAs, handheld gaming devices, media players, etc.), PC's 125 (e.g., notebooks, netbooks, desktop computers, etc.), cloud computers 130, etc.

The display interface module 100 enables the display surface 110 to act as a thin client that allows users to interact with any one or more of heterogeneous computing devices 105. More specifically, the display interface module 100 receives and manages screen streams (i.e., an encoded sequence of images corresponding to the current screen, or a portion thereof, for each heterogeneous computing devices 105) and controls from one or more of the heterogeneous computing devices 105, generates a corresponding display signal and sends that display signal to the display surface 110 via a wired or wireless interface.

As discussed in further detail throughout Section 2 of this document, the display interface module 100 runs a software "agent" that communicates with each of the connected heterogeneous computing devices 105 via a separate software "agent" running on each of those computing devices. In general, when a user 175 is interacting with one of the heterogeneous computing devices 105 via a virtual display of one of those devices provided on the display surface 110, the agent (running on the display interface module 100) manages each host (and thus the corresponding computing devices) by sending input events generated via wearable sensors 180 or other input devices, to the display interface module.

The input events received by the display interface module 100 are then provided to the corresponding host which converts those input events into user inputs that are understood by the heterogeneous computing device 105 running that host. That heterogeneous computing device 105 then responds as if those user inputs had been received locally. Screen events (e.g., display changes) on the heterogeneous computing device 105 resulting from that user input are then sent by the corresponding host to the display interface module 100. The display interface module then updates the corresponding virtual display on the display surface 110 so that the user can remotely interact with and control a plurality of heterogeneous computing devices 105.

Note also that the virtual display corresponding to each of the heterogeneous computing devices 105 can be provided in a separate window on the display surface 110. Therefore, the user can select from one or more heterogeneous computing devices 105 by selecting from a plurality of virtual displays provided concurrently on the display surface 110. Alternately, the entire display surface 110 can be devoted to a single heterogeneous computing device 105. Further, the virtual display of any of the heterogeneous computing devices 105 can either correspond to a display of each corresponding heterogeneous computing device, or any of those virtual displays can represent an image of a particular remote heterogeneous computing device, along with virtual and interactive representations of whatever controls may exist on that heterogeneous computing device. In a simple example of this embodiment the remote heterogeneous computing device is a mobile phone with a QWERTY keyboard, so an image of the entire phone (and the phone's screen or display) is provided as a virtual display on the display surface 110. Further, a virtual representation of the QWERTY keyboard of that phone within that virtual display is interactive such that the user can access that keyboard virtually to make calls, send or receive email, manage contacts, etc., as if the user were actually holding and using that phone.

Note that in a tested embodiment, an off-the-shelf ICETEK OMAP3530 Mini Board was adapted to implement the display interface module 100. Note that the ICETEK OMAP3530 Mini Board runs the Windows® Embedded CE operating system, with a 600 MHz CPU and 128 MB RAM, which provides sufficient computational and memory/storage resources to enable all of the functionality described herein. However, it should be understood that although the functionality described herein can be implemented by adapting off-the-shelf products, specially designed hardware for implementing these capabilities can be significantly smaller than the aforementioned ICETEK OMAP3530 Mini Board. In fact, this functionality could be implemented into the framework of a mobile phone, PDA or the like without a significant increase (or potentially no increase) in size or weight of that device. Further, by implementing these capabilities into a mobile phone or the like, wearable sensors using wireless technologies, such as Bluetooth®, for example, can be both small in size and provided as accessories to the mobile device or the like.

One of many examples of a conventional inertial sensor that can be easily adapted for use with the Interactive Virtual Display for implementing wearable sensors is the well-known Shimmer™ device by "Shimmer Research". In general, the Shimmer™ is a small wireless sensor platform that can record and transmit physiological and kinematic data in real-time. Designed as a wearable sensor, various implementations of Shimmer™ incorporate wireless ECG, EMG, GSR, Accelerometer, Gyro, PIR, Tilt and Vibration sensors. In various embodiments adapted for use with the Interactive Virtual Display, the wearable Shimmer™ sensors includes a single 3-axis accelerometer having a sample rate set to 512 Hz (8 bits per sample per axis), with the acceleration signals being transmitted via Bluetooth® to the display interface module 100. The resulting acceleration information is sufficient to implement the various wireless touch and multi-touch type interfaces described herein.

2.0 Operational Details of the Interactive Virtual Display:

The above-described program modules are employed for implementing various embodiments of the Interactive Virtual Display. As summarized above, the Interactive Virtual Display provides various ubiquitous user interaction techniques that enable user access and control of remote heterogeneous computing devices from any local display surface, regardless of where those devices are located relative to the user. The following sections provide a detailed discussion of the operation of various embodiments of the Interactive Virtual Display, and of exemplary methods for implementing the program modules described in Section 1 with respect to FIG. 1. In particular, the following sections provides examples and operational details of various embodiments of the Interactive Virtual Display, including: an operational overview of the Interactive Virtual Display, the system architecture of the Interactive Virtual Display; virtual display functionality of the Interactive Virtual Display; screen compression and adaptation; virtual user interface; and ubiquitous input.

2.1 Operational Overview:

The virtual display techniques provided by the Interactive Virtual Display differ from existing solutions in several aspects. For example, the Interactive Virtual Display is capable of interfacing with any display surface to display the screen contents of multiple remote heterogeneous computing devices concurrently, in a one-agent-multiple-host communication model, rather than a typical point-to-point connection model. Further, the Interactive Virtual Display addresses remote heterogeneous computing devices in various network conditions in a way that allows even thin devices with limited computing power and network bandwidth to achieve interactive screen updates in the virtual display provided by the Interactive Virtual Display. In addition, rather than directly displaying the screen contents of remote heterogeneous computing devices, the Interactive Virtual Display instead provides an augmented user experience by local processing and composing the visual contents of multiple remote devices via the aforementioned portable display interface module.

The ubiquitous interaction techniques provided by the Interactive Virtual Display removes hardware and space constraints for users to interact with heterogeneous computing devices. An exemplary schematic diagram illustrating the use of wearable sensors and portable hardware (i.e., the small and portable display interface module) to interact with remote heterogeneous computing devices is shown in FIG. 2.

Figure 2:
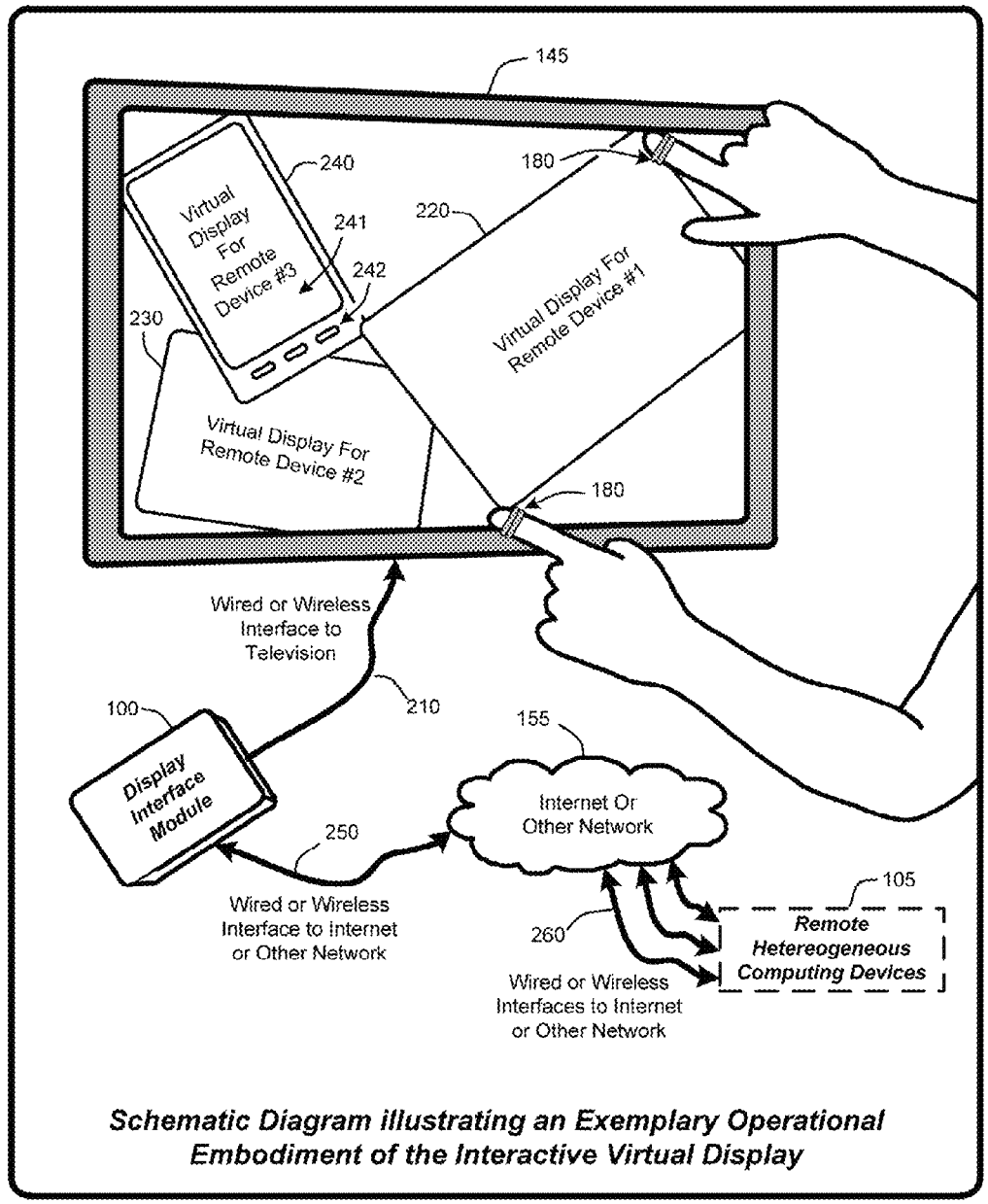
FIG. 2 provides a schematic diagram that illustrates an exemplary operational embodiment of the Interactive Virtual Display, as described herein.

For example, as illustrated by FIG. 2, the Interactive Virtual Display is implemented on a display surface, that, in this example, is a television 145. As can be seen, the display surface provided by the television 145 includes three virtual displays corresponding to three separate remote heterogeneous computing devices 105. In particular, the three separate virtual displays shown include a virtual display for remote device #1 220, a virtual display for remote device #2 230, and a virtual display for remote device #3 240. Each of these remote devices is in communication with the display interface module 100 through the Internet or other network 155 via wired or wireless connections 250 and 260, as illustrated. Note that there is no requirement for any of the remote heterogeneous computing devices 105 to be collocated, and that each of these devices may have shared or separate connections to the internet or other network 155, depending upon their locations and configurations. Further, the display interface module 100 is connected to the television 145 via a wired or wireless connection 210.

As discussed herein, an instance of the aforementioned host runs on each of the remote heterogeneous computing devices 105. Each host is in communication with the aforementioned agent running on the display interface module 100. The display interface module 100 receives input from the user, which in this example is provided by wearable sensors 180 (e.g., multi-axis accelerometers) that are illustrated on a fingertip on each of the user's left and right hands. As discussed in further detail herein, the use of these types of sensors provide the Interactive Virtual Display with multi-touch type capabilities for user interaction with one or more of the virtual displays (e.g., 220, 230, or 240) of the corresponding remote heterogeneous computing devices 105.

This input received by the agent in from the wearable sensors 180 is then sent from the agent to the corresponding host (via the Internet or other network 155). That host then ensures that the corresponding remote heterogeneous computing device performs whatever task or action is associated with the input provided by the agent. Resulting screen changes or updates are then provided by the host back to the agent, so that the display interface module 100 can update the corresponding virtual display (e.g., 220, 230, or 240) on the display surface, which in this example is television 145.

Further, as noted above, in various embodiments, rather than just provide the video output of a particular heterogeneous computing device in a window on the display surface, a virtual representation of the actual remote heterogeneous computing device can be provided as an interactive virtual device along with a corresponding display. This embodiment is illustrated by the virtual display for remote device #3 240, which shows an image of a mobile device, such as a PDA, the screen 241 of that mobile device, and user accessible virtual buttons or controls 242 that can be selected or operated by the user. In this example, interaction with and control of the mobile device displayed on the display surface will allow the user to interact with and control the actual remote mobile device, while the virtual representation of that mobile device responds in the same manner as the remote mobile device.

2.2 System Architecture:

In general, as summarized above, the general architecture of the Interactive Virtual Display system includes wearable sensors (or other input devices) and a small portable component (i.e., the display interface module) for interfacing the display surface with one or more remote heterogeneous computing devices via the Internet or other network. The wearable sensors typically include one or more inertial sensors, and are used to provide touch and/or motion-based user input. The display interface module includes small-size programmable hardware with basic computing, storage and networking capabilities. The wearable sensors and the display interface module can communicate with each other via a wired connection, or via wireless personal area network (PAN) connections, such as Bluetooth® or other radio frequency technologies.

For any display surface accessible to the user, the display interface module can be connected to that surface via standard video interfaces, such as, but not limited to, VGA, DVI, HDMI, various wireless protocols, etc. In this way, any display surface can be augmented to become a thin-client machine for ubiquitous user interaction with a plurality of remote heterogeneous computing devices. In particular, through the thin-client machine enabled by the Interactive Virtual Display, the user can remotely access and control heterogeneous computing devices he owns or has access to via different networks, including, but not limited to, sensing devices, mobile devices, PCs, cloud computers, etc., regardless of where those devices are so long as they can be reached via a wired or wireless network from the user's location.

Figure 3:
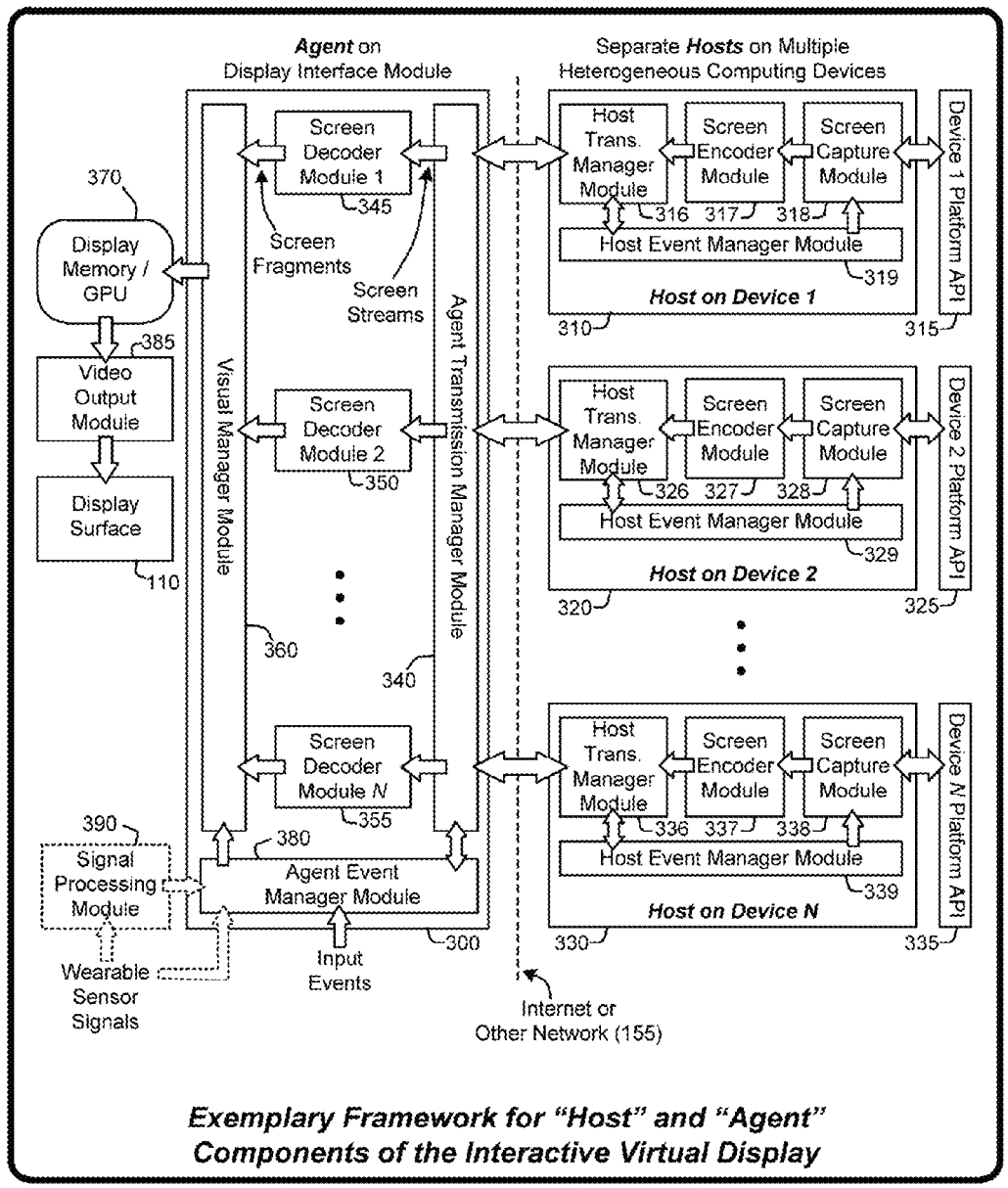
FIG. 3 provides an exemplary architectural flow diagram that illustrates an exemplary framework for "host" and "agent" components of the Interactive Virtual Display, as described herein.

Based on the general architecture described above, an exemplary interactive virtual display framework for communications between the aforementioned agent and hosts is illustrated in FIG. 3. In particular, the diagram of FIG. 3 illustrates the interrelationships between program modules for implementing various embodiments of the agent and host components of the Interactive Virtual Display, as described herein. Furthermore, while the system diagram of FIG. 3 illustrates a high-level view of various embodiments of the Interactive Virtual Display, FIG. 3 is not intended to provide an exhaustive or complete illustration of every possible embodiment of the agent and host components of the Interactive Virtual Display as described throughout this document. Further, it should be noted that FIG. 3 only depicts one of a number of possible interconnection topologies for local and remote devices, e.g., the display interface module running the agent and the remote devices running instances of the host form a star topology in the example of FIG. 3. In addition, it is also possible to deploy both the host and an instance of the agent on particular remote devices to fully utilize their rendering and networking capabilities. See Section 2.4 for further detail regarding networking topologies.

As noted above, in addition to the display interface module and one or more user input devices (e.g., the wearable sensors) the framework of the Interactive Virtual Display has at least two additional components, including the Interactive Virtual Display agent and the Interactive Virtual Display host that are illustrated by FIG. 3. Typically, the agent 300 is deployed or run on the display interface module. Separate instances of the host (310, 320, and 330) are then deployed on each of the heterogeneous computing devices to be access by the user. Each host (310, 320, and 330) is responsible for sending encoded screen image sequences (i.e., "screen streams") of its device to the agent 300 for constructing a corresponding virtual display on the display surface 110, and for and receiving input events from the agent for device control.

While running, each host (310, 320, and 330) keeps listening to connection requests from one or more agents. Note that one or more different users may connect to the same remote heterogeneous computing device via separate agents (running on separate display interface modules). However, this embodiment is a simple extension to the case where only one agent 300 connects to each host (310, 320, and 330) that is analogous to allowing multiple users to share access to a single device. Consequently, the following discussion will focus on the use of a single agent 300. Further, each separate host (310, 320, and 330) includes the same or similar components that operate in the same manner as corresponding components on each other host. Consequently for purposes of explanation, those components, i.e., a host transmission manager module (316, 326, and 336), a screen encoder module 317, 327, and 337), a screen capture module (318, 328, and 338), a host event manager (319, 329, and 339), and a device specific platform API (315, 325, and 335), will be discussed in terms of the host 310 and the corresponding host components (315, 316, 317, 318, and 319).

Once a connection is established between the host 310 and the agent 300, the screen capture module 318 of that host periodically captures the device's display images (either full-screen or in a configurable rectangular region). The captured sequence of screen images are compressed or encoded by the screen encoder module 317 to generate the aforementioned "screen streams" that are then then transmitted to the agent 300 by the host transmission manager module. The host transmission manager module also receives control events (i.e., user input) from the agent 300. Those received control events are then subsequently interpreted by the host event manager 319, and then used to control the screen capture module 318 or directly routed to the operating system of the remote heterogeneous computing device by a device specific API 315. In other words, each different type of heterogeneous computing device may require a different set of software drivers or the like. These drivers are instantiated in a device specific platform API (e.g., platform API 319) that allows the agent 300 to interact with that particular type of heterogeneous computing device via the corresponding host 310.

The agent 300 can connect to any remote heterogeneous computing device for display and control, on which an instance of the host (310, 320, and 330) is active (and for which the user or his display interface module has access or the ability to authenticate an optionally secure connection). In general, the agent 300 contains several main components, including an agent transmission manager module 340, a separate instance of a screen decoder module (345, 350 and 355) corresponding to each separate host instance (although the operations of the separate screen decoder modules could be implemented within a single screen decoder module, if desired), a visual manager module 360, and an agent event manager module 380.

The agent transmission manager module 340 is responsible for creating and maintaining connections to one or more hosts (310, 320, and 330). The compressed screen streams received from the connections to each host (310, 320, and 330) are then delivered to a corresponding one of the screen decoder modules (345, 350, 355), which decompress the screen streams into "screen fragments" (i.e., a portion of the overall display presented on the display surface corresponding to a particular heterogeneous computing device). Afterwards, all the screen fragments are sent to the visual manager module 360. The visual manager module 360 then composes the screen fragments into a final display in combination with appropriate visual effects according to the input (e.g., cursor movements, selection events, etc.) of the agent event manager module 380. Once the final display has been composed, it is provided to a video memory/GPU 370 of the display interface unit, which in turn sends that final display to a video output module 385 that is connected to the display surface 110 (via a wired or wireless connection, as described above), where the final display is then visible to the user.

In addition, the proposed framework also contains an optional signal processing module 390 for processing input from wearable sensors, Various sensors provide different levels of functionality. For example, if the sensor has an on-chip operating system (e.g., TinyOS system) as well as on-chip processing capability, an inertial signal processing firmware can be deployed directly on the sensor to carry out or assist with the input event detection, which helps to reduce the bandwidth cost in sensor data transmission. In this case, that sensor input is simply provided as input events to the agent event manager module 380. Otherwise, the signal processing module 390 is included as a component of the overall display interface module (either as a software, firmware, or hardware implementation) to process and convert incoming raw sensor data from the wearable sensors to input events that are understandable by the agent event manager module 380.

It should be noted that among the remote heterogeneous computing devices, many sensing devices don't have native displays, and are only able to sense and transmit signals (examples include, but are not limited to, thermocouples, accelerometers, pressure sensors, smoke detectors, alarm systems, microphones, various types of cameras, etc.). In this case, the hosts won't be deployed on those types of heterogeneous computing devices. Instead, the sensed signals will be directly sent or routed to the agent, where the visual manager module 360 converts them into bitmaps based on predefined virtual display schemas for each particular type of heterogeneous computing device. Since these types of limited functionality heterogeneous computing devices can be seen as a subset of the interactive virtual display process as shown in FIG. 3, the following discussion will primarily focus on the heterogeneous computing device on which the hosts are deployed.

2.3 Screen Compression and Adaptation:

In order to both limit bandwidth usage of the Interactive Virtual Display and to improve perceived responsiveness, screen compression is carried out on the remote heterogeneous computing devices using the hosts as discussed above with respect to FIG. 3. While various compression techniques can be used for these purposes, in tested embodiments, screen compression techniques based on the methods described in co-pending patent application entitled "GPU Accelerated Screen Codec" which was filed Dec. 19, 2008 and assigned Ser. No. 12/340,410, and in co-pending patent application entitled "Remote Computing Platforms Providing High-Fidelity Display and Interactivity for Clients" which was filed Mar. 20, 2009 and assigned Ser. No. 12/408,611, the subject matter of both patent applications being incorporated herein by these references. The various methods described in these co-pending patents have been further modified, as discussed below, to develop practical techniques for adaptation to multiple concurrent heterogeneous computing devices and various network conditions.

In particular, in the screen compression process used in various embodiments of the Interactive Virtual Display, the screen encoder running on the host (see "screen encoder module" (317, 327, 337) of FIG. 3) takes input screen images from the screen capture module, which is driven by a configurable timer (such that screen images are captured at a configurable rate). As discussed below with respect to FIG. 4, the input images are divided into non-overlapped blocks, at a configurable rectangular block size, on the order of about 16×16 pixels (note there is no requirement that these blocks are square). These blocks are then classified into three categories, including skip blocks, text blocks, and image blocks (see aforementioned co-pending patents for a detailed discussion of these types of blocks).

In general, skip blocks are those blocks whose contents do not change from one screen capture to the next, which are detected by comparing a current screen frame with a buffered previous screen frame. Text blocks and image blocks are classified as being either text or images based on a color histogram of the block pixels. Color quantization is applied to the text blocks that contain discontinuous colors with high contrast. Image blocks with smooth color changes are compressed using JPEG-like transform coding. Finally, a context-adaptive arithmetic coder is employed for entropy coding. Again, specific details and examples of this type of coding are provided in the aforementioned co-pending patent applications.

Based on the above-summarized compression framework, a new client-driven screen encoding adaptation method is provided to improve the performance of the Interactive Virtual Display system. First, the Interactive Virtual Display avoids compressing and transmitting unnecessary screen regions using the host by monitoring the virtual display composing process at the agent (see discussion of the visual manager module 360 of FIG. 3). Since the screen fragments (i.e., one fragment for each separate host/heterogeneous computing device) are dynamically post-processed according to user's input and then rendered by the agent, the Interactive Virtual Display dynamically controls the screen compression and transmission process based on the agent's behavior. More specifically, the agent of the Interactive Virtual Display monitors some or all of three typical behaviors of each virtual display in the agent: occlusion, scaling, and focus.

Take the virtual display shown in FIG. 2 as an example. In this case, it can be seen that the screen fragment corresponding to the virtual display for remote device #1 220 overlaps (or occludes) portions of both the screen fragments for the virtual display for remote device #2 230 and the virtual display for remote device #3 240. Further, the virtual display for remote device #3 240 also occludes a portion of the virtual display for remote device #2 230. Formally stated, an occlusion is detected once two or more screen fragments are fully or partially overlapped in the virtual display. In that case, the hidden blocks of the overlapped screen fragments will not be compressed and transmitted by the screen encoder module of the host. This process is enabled by the agent informing the corresponding host of what portions of the captured screen are occluded by some other fragment. The corresponding host then simply omits those occluded from the compression process, thereby decreasing the size of the compressed screen image and reducing bandwidth used for transmission of the compressed screen fragment.

With respect to scaling, each screen fragment is first scaled by the agent, then the scaling factors used for each screen fragment are sent by the agent to the corresponding host to notify the screen capture module. If the scaling factor is less than 1.0, the screen capture module will down-sample the original screen image to fit its virtual display size. Also, each host is kept aware of focus changes (i.e., whatever virtual display is currently being interacted with by the user is considered to be the current focus, with all other virtual displays not being the current focus of the user. In various embodiments, screen update rates for virtual displays that are not the focus of the user may are decreased to reduce bandwidth requirements for transmitting compressed screen images (i.e., "screen streams"). Thus in the overall virtual display provided by the Interactive Virtual Display, user-focused screen fragments are updated at a relatively higher frame rate, while the other screen fragments can be updated at lower frame rates. This embodiment is especially useful for reducing bandwidth requirements as the overall number of concurrent heterogeneous computing devices connected to the Interactive Virtual Display becomes increasingly large.

2.3.1 Region of Interest (ROI) Control:

The above described techniques can significantly improve the average system performance of the Interactive Virtual Display. However, they make little contribution to various worst case performance scenarios. For example, when the screen capture, encoding, transmission, and decoding time on various remote heterogeneous computing devices was evaluated for tested embodiments of the Interactive Virtual Display, it was observed that encoding complexity and transmission delay usually become a bottleneck for the thin host devices (with little or no graphics processing capabilities). Moreover, the decoding complexity is a factor that is considered for the virtual display resolution and post-processing effects that can be supported by the display interface module. Therefore, to improve the worst case performance of the Interactive Virtual Display system, the concept of interactive region of interest (ROI) control is introduced into the aforementioned screen encoding adaptations.

In general, interactive ROI control automatically and dynamically trades off between screen update rate and updated region size. As described above, a screen frame that is captured at the host is divided into blocks, and then compressed block by block. For thin devices such as smart phones, an active region (i.e., the ROI) can be created to prioritize update rates of different screen contents for a particular host. In other words, various regions (or blocks) of any particular virtual display for a particular heterogeneous computing device can have different update rates, depending upon the current ROI.

Typically, the active region has an update rate as high as possible (or as high as necessary to provide a good user experience), while the other parts of the virtual display for that particular remote heterogeneous computing device can be updated at a much lower rate. In the most extreme case, non-active regions for a particular virtual display will stop updating even if their contents have changed.

Figure 4:
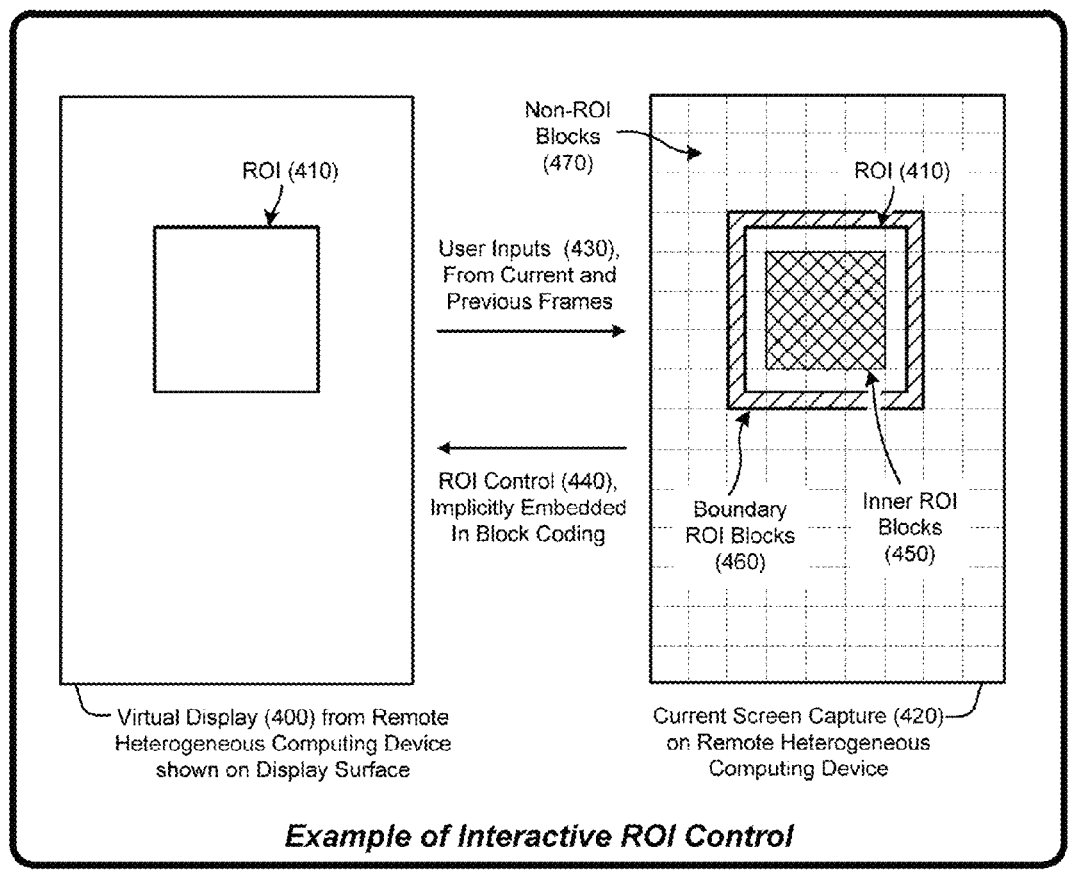
FIG. 4 provides an illustration of the use of interactive regions of interest (ROI) for reducing bandwidth requirements of the Interactive Virtual Display, as described herein.

As shown in FIG. 4, ROI control (440) is implicitly embedded in the block coding. The position of the active region, i.e., ROI 410 on a virtual display 400 shown on a display surface is determined based on the user's input (430) from the agent running on the display interface module. Given the position of the ROI 410, the host automatically calculates a proper "active region" of complete blocks for the current screen capture 420 on the remote heterogeneous computing device that fully encompasses the ROI using screen window layout information and a simple edge detection algorithm. "Non-ROI blocks" (470), whose pixels are all fully out of the active region, are identified as skip blocks if the current frame is for ROI 410 update. "Boundary ROI blocks" 460, which cross the active region boundary (i.e., some pixels within the ROI 410 and some pixels out of the ROI), will first use previous frame padding to force their out-of-ROI pixels to have the same value as in the buffered previous frame, and then go through the encoding pipeline (block classification, text/image block coding, entropy coding, as described in detail the aforementioned copending patent applications) together with "inner ROI blocks" 450 that represent blocks that are completely within the ROI 410. In this way, the active region need not to be block aligned, thus avoiding possible visual disturbance or artifacts at the ROI 410 boundary when rendered or displayed on the display surface by the display interface module.

Note that the adaptation of different heterogeneous computing devices can be achieved by controlling the active region size. In particular, during a connection set up phase between the agent and a particular host, the screen compression and transmission speed at the host device is estimated. It is assumed that the active region size is proportional to the screen update rate of the corresponding virtual display. Therefore, given an expected screen update rate, the rectangular height and width of the active region can be calculated. Afterwards, the region size can be dynamically adjusted to adapt device workload change and network jitter.

One advantage of the client-driven screen encoding adaptation method described above is that the adaption is configured and carried out at each individual remote device, which is transparent to the agent. Further, due to the block-based screen compression and block classification, the adaptation is implicit in the block type and screen capture timer (i.e., how often screen images are captured for each heterogeneous computing device). This makes the agent very simple and efficient, which can utilize a uniform screen decoder (see screen decoder modules (345, 350, and 355) of FIG. 3) to handle all the compressed screen streams from the various heterogeneous computing devices at different adaptation levels.

2.4 Virtual User interface:

A new virtual user interface is used to implement the Interactive Virtual Display system in order to enable the one-agent-multiple-host scenario described above. In traditional point-to-point virtual display systems, remote screens can be directly displayed on local display surfaces to provide a consistent user experience. However, for multiple remote heterogeneous computing devices, how to virtualize a uniform interface for the local user to access and manage them all together becomes a problem.

This problem is solved by the Interactive Virtual Display system by decoupling screen content generation and composition to develop a virtual user interface. As shown in FIG. 3, the content generation process is typically carried out on the remote heterogeneous computing devices (via the screen capture module for each host). The remote programs leverage various resources on these devices and generate 2D images (windows) as output. The hosts compress and transmit these 2D screen fragments to the agent, where the virtual user interface composition process is carried out by the visual manager module, as discussed above.

The agent-based visual manager module takes each screen fragment as an operating element, and uses all these contents to compose a final display. Hence, the final display composition does not rely on the resources and capabilities of the remote devices. Also, custom manipulations and visual effects can be performed on the agent, regardless of whether those visual effects are supported by any of the remote heterogeneous computing devices. By this means, a virtual user interface that is truly independent of the remote heterogeneous computing devices is provided to the user. For example, in a tested embodiment of the Interactive Virtual Display, screens of remote smart phones, PCs and workstations are composed into a Windows® Vista®/Windows® 7 style user interface with custom effects such as flip 3D, or composed into a Windows® Surface® style user interface to support window panning, zooming, rotation, scaling, etc. Two techniques are employed by the Interactive Virtual Display to implement various embodiments of the virtual user interface.

The first of these techniques is based on a star network topology as shown in FIG. 3. In particular, in a star topology, all of the remote heterogeneous computing devices are directly connected to the agent (via the Internet or other network) running on the display interface module. A set of virtual composing drivers (each corresponding to the particular heterogeneous computing device being represented) are also deployed on the display interface module. The agent uses separate rectangle windows to contain different screen fragments, and calls different virtual drivers to mimic different user interfaces (each corresponding to the particular heterogeneous computing device being represented). One advantage of this embodiment is that the window operations and visual effects can be performed locally (by the agent and/or the display interface module), so that the related input events need not to be sent to remote devices to significantly reduce the response delay.

One potential disadvantage of the star topology is that different virtual display drivers (one for each different heterogeneous computing device) are created and loaded to the local agent, thereby restricting the experience and performance of the virtual user interface as a function of the capabilities of the underlying hardware and software of the display interface module.

Besides the star topology, the Interactive Virtual Display system can be also arranged in a tree topology. In this case, a remote device can run both the host and the agent, where the agent receives screen fragments from other devices and the host generates and transmits the composed screen image using these fragments. When running both the agent and the host, devices are referred to as "internal-node devices", while any remote heterogeneous computing devices that are only running the host are referred to as "leaf-node devices". In this configuration, the local display interface module can be seen as the root node of the tree topology.

Typically, internal-node devices are expected to be more powerful than leaf-node devices, because of the additional computations (decoding and composing) performed by the agent. Thus the internal-node devices can decode and post-process the received screen fragments, adding their native visual effects for the virtual display without custom display drivers' support. Alternatively, the internal-node devices can directly relay the compressed screen fragments from leaf-node devices to the root (i.e., the local display interface module connected to the display surface for local user viewing and interaction). This saves computing power, but at the same time leads to compromised visual effects since pixel-level post-processing is no longer allowed.

Note that the tree-topology based virtual display does not increase the amount of data that is transmitted for each remote heterogeneous computing device. In particular, because screen fragments are transmitted in the form of 2D images, the captured and transmitted data size is bounded by the display resolution of the host device. The size and position of each screen fragment is synchronized between event managers at the agent and the host, so that the captured screen images can be properly cropped and scaled before compression and transmission to avoid bandwidth waste.

One potential disadvantage of the tree topology is increased delay relative to the star topology configuration. In particular, it can be seen that leaf-node devices may communicate with the root via multiple hops through different levels of the tree, which will increase the display and response delay. Consequently, in various embodiments, the Interactive Virtual Display uses a direct event routing method to reduce the input response time. In particular, the event manager module of the agent maintains an event routing table that maps different display regions to different remote devices. Internal-node devices then help the root update the routing table items of the leaf-node devices, so that the input events for the leaf-node devices won't go through multiple hops (or at least, the number of hops can be reduced).

2.5 Ubiquitous Input:

Given that the visual contents of different remote heterogeneous computing devices can be displayed on any ubiquitous display surfaces, it is useful to develop an input mechanism, i.e., a "ubiquitous input") that enables users to naturally interact with the remote heterogeneous computing devices through any available display surface. In general, two basic concepts are considered for this input mechanism, though additional concepts and parameters may be considered for implementing particular UI features, if desired. First, in order to implement a ubiquitous input mechanism, it is useful for that input mechanism to be universally applicable to any display surface in any environment. Second, it is also useful to construct a ubiquitous input mechanism that is capable of providing a rich user experience that is comparable to various state-of-the-art solutions.

As discussed above, in various embodiments of the Interactive Virtual Display, a wearable accelerometer-based ubiquitous input mechanism is used to implement the ubiquitous input mechanism. As is well known to those skilled in the art, advancements in MEMS technologies have allowed more and more tiny accelerometers to be embedded into mobile devices and wearable sensors, which can be taken with users anywhere. In contrast to existing inertial sensor based input methods, the ubiquitous input mechanism provided by various embodiments of the Interactive Virtual Display provides in situ input with a touchscreen-like user experience. In other words, users can directly touch any display surface just like operating a conventional resistive or capacitive touchscreen. Furthermore, with multiple accelerometers, various embodiments of the ubiquitous input mechanism can provide even richer user experience with multi-touch support.

2.5.1 Single-Accelerometer Pointing:

As a baseline for ubiquitous input, a single 3-axis accelerometer is used to support pointing operations. More specifically, one 3-axis accelerometer, such as the aforementioned Shimmer™ sensor, is attached to one finger. Finger gestures are then used to simulate most mouse events by evaluating acceleration profiles or sequences associated with various user finger gestures. Intuitively, the basic idea is to directly operate the display surface as a touchscreen, regardless of the actual capabilities of that display surface (e.g., the "display surface" may simply be a wall on which images the virtual displays of various heterogeneous computing devices is projected). While it should be clear that any number of different finger gestures can be used to implement a user interface, in various tested embodiments, figure touch, finger move and finger rotation were selected as natural control gestures that would be easy for the user to use. These gestures were then mapped (using measured finger acceleration events) to corresponding mouse events, as shown in Table 1.

TABLE 1

| Finger Gesture to Mouse Event Mapping | |
| --- | --- |
| Mouse Events | Finger Gestures |
| Left button click | Finger full-touch |
| Left button double click | Double finger full-touches |

TABLE 1-continued

| Finger Gesture to Mouse Event Mapping | |
| --- | --- |
| Mouse Events | Finger Gestures |
| Mouse move | Finger rotation |
| Right button click | Finger half-touch |
| Drag | Finger half-touch with rotation |

Figure 5:
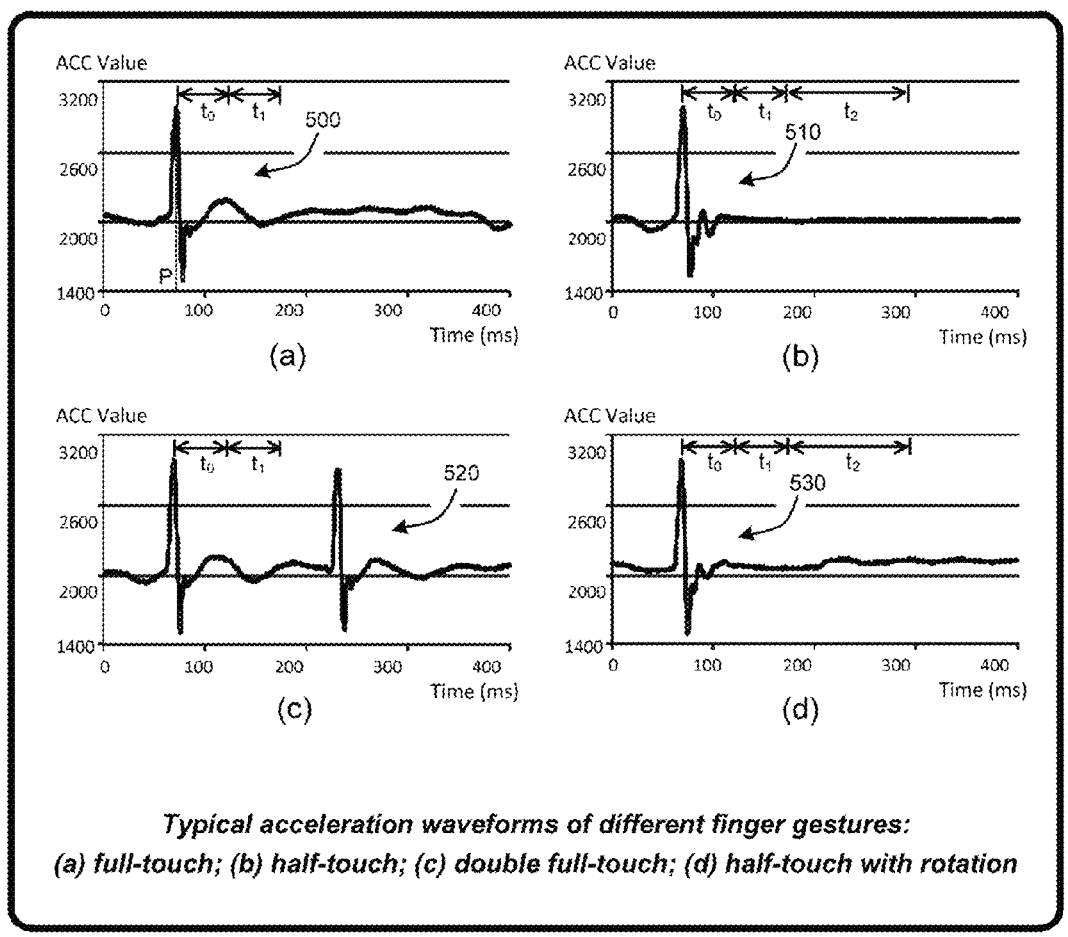
FIG. 5 provides an illustration of exemplary acceleration waveforms when using wearable accelerometers as user input devices for interacting with one or more heterogeneous computing devices, described herein.

In particular, using the 3-axis accelerometer, a finger "full-touch" is defined as the user finger touching down and then going back up, while a "half-touch" means the finger touches down and then keeps still for some relatively short period. Finger "rotation" is measured by the tilt angle of the finger. FIG. 5 depicts typical acceleration waveforms of different control gestures. In view of these waveforms, it can be seen that peaks in the waveforms indicate the occurrence of full-touches (500) or half-touches (510), while other waveform variations further characterize the different finger gestures such as, for example, a double full touch 520 and a half touch with rotation 530. In general, once the various types of waveforms associated with particular finger gestures have been characterized, the display interface module simply reads data packets data packets from the accelerometer in real-time, to detect the peaks in the acceleration signal based on length transforms. If no peaks are detected, the tilt angle of the finger is calculated to trigger possible mouse move events. Further, as illustrated in FIG. 5, a t1-period variance of the signal is used to differentiate full-touches from half-touches, and a t2-period variance of the signal is used to determine whether rotation occurs during the half-touch. Note that double clicks are automatically triggered if two full-touches occur within a short time span, as illustrated with respect to the waveform for the double full touch 520.

2.5.2 Multi-Accelerometer Multi-Touch:

It is straightforward to extend the single-accelerometer pointing method to achieve multi-touch by using multiple accelerometers (e.g., one 3-axis accelerometer on one finger of each if the user's hands). In various embodiments, two identical Shimmer™ sensors were used to implement a two point multi-touch input mechanism. Typically, the user attaches the two sensors to one finger on each hand, and then directly operates on the display surface. The agent communicates with the both sensors via the display interface module and displays two cursors on the surface to facilitate the finger operations (See FIG. 2 for example). The agent event manager module (or optional signal processing module as illustrated in FIG. 3) processes acceleration signals from the both sensors, and detects different input events in real time. For most cases, the two accelerometers work independently. Each of them triggers particular mouse events for one cursor as described in Section 2.5.1.

However, in addition to the events described above for the use of a single accelerometer, several multi-touch events that leverage the cooperation of both sensors are defined. Specifically, if the two cursors are operating on the same window, the user can drag them concurrently to provide additional window control events. For example, dragging the two cursors to the same direction can trigger a window move event, while dragging them to opposite directions can trigger zoom in and zoom out events. Dragging the cursors to trace a circle or arc can trigger window rotation events. As with the waveforms illustrated in FIG. 5, all of these events are detected based on the waveform changes similar to the single-accelerometer case.

The ubiquitous input solutions described above have a number of advantages over conventional touch-based input schemes. For example, these solutions only rely on accelerometers, and no additional buttons, controls, or hardware is needed. Thus the wearable sensors can be made in a very small form factor (e.g., about the size of a thin ring or band placed on the finger). Further, accelerometer-based ubiquitous input mechanisms as described above don't require careful deployment or calibration for individual users. The user simply places the accelerometers on her fingers and begins providing input. In addition, the above-described ubiquitous input can be used for different types of display surfaces, either by operating on screen or off screen. Finally, this type of ubiquitous input is both flexible and extensible. For example, using more accelerometers or collaborating with other kinds of wearable sensors (e.g., speech recognition via microphone input, camera-based eye or finger tracking, etc.) can provide an even richer UI experience for the user.

Figure 6:
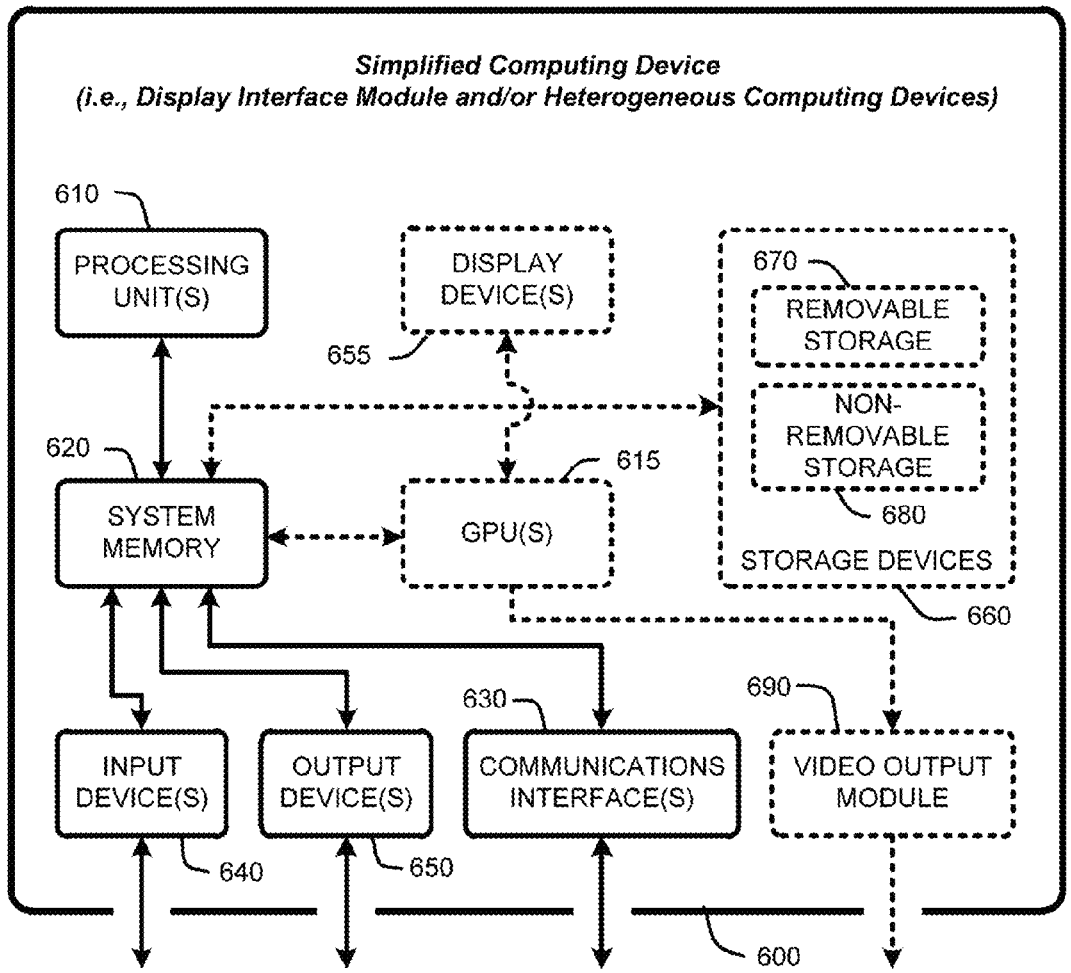
FIG. 6 is a general system diagram depicting a simplified general-purpose computing device having simplified computing and I/O capabilities for use in implementing various embodiments of the Interactive Virtual Display, as described herein.

3.0 Exemplary Operating Environments:

The Interactive Virtual Display described herein is operational with or within numerous types of general purpose or special purpose computing system environments or configurations. FIG. 6 illustrates a simplified example of a general-purpose computer system on which various embodiments and elements of the Interactive Virtual Display, as described herein, may be implemented, and also illustrates a general purpose or special purpose computing system for implementing various heterogeneous computing devices for use with the Interactive Virtual Display. It should be noted that any boxes that are represented by broken or dashed lines in FIG. 6 represent alternate embodiments of the simplified computing device, and that any or all of these alternate embodiments, as described below, may be used in combination with other alternate embodiments that are described throughout this document.

For example, FIG. 6 shows a general system diagram showing a simplified computing device 600. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc.

To allow a device to implement the Interactive Virtual Display, the device should have a sufficient computational capability and system memory to enable basic computational operations as well as video output capabilities. In particular, as illustrated by FIG. 6, the computational capability is generally illustrated by one or more processing unit(s) 610, and may also include one or more GPUs 615, either or both in communication with system memory 620. Note that that the processing unit(s) 610 of the general computing device of may be specialized microprocessors, such as a DSP, a VLIW, or other micro-controller, or can be conventional CPUs having one or more processing cores, including specialized GPU-based cores in a multi-core CPU. Video output capabilities are enabled by a video output module 690, having wired or wireless connection capabilities to the aforementioned display surface (similar to the video output module 385 of FIG. 3), that is in communication with one or more GPU's 615 (similar to the display memory/GPU 370 of FIG. 3).

In addition, the simplified computing device of FIG. 6 may also include other components, such as, for example, a communications interface 630. The simplified computing device of FIG. 6 may also include one or more conventional computer input devices 640 (e.g., pointing devices, keyboards, audio input devices, video input devices, haptic input devices, devices for receiving wired or wireless data transmissions, etc.). The simplified computing device of FIG. 6 may also include other optional components, such as, for example, one or more conventional computer output devices 650 (e.g., display device(s) 655, audio output devices, video output devices, devices for transmitting wired or wireless data transmissions, etc.). Note that typical communications interfaces 630, input devices 640, output devices 650, and storage devices 660 for general-purpose computers are well known to those skilled in the art, and will not be described in detail herein.

The simplified computing device of FIG. 6 may also include a variety of computer readable media. Computer readable media can be any available media that can be accessed by simplified computing device 600 via storage devices 660 and includes both volatile and nonvolatile media that is either removable 670 and/or non-removable 680, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Storage of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the Interactive Virtual Display described herein, or portions thereof, may be stored, received, transmitted, or read from any desired combination of computer or machine readable media or storage devices and communication media in the form of computer executable instructions or other data structures.

Finally, the Interactive Virtual Display described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

The foregoing description of the Interactive Virtual Display has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate embodiments may be used in any combination desired to form additional hybrid embodiments of the Interactive Virtual Display. It is intended that the scope of the invention be limited not by this detailed description, but rather by the claims appended hereto.

What is claimed is:

1. A method for providing virtual displays of a plurality of remote heterogeneous computing devices on a local display surface, comprising steps for:
   providing a locally constructed composite display comprising a separate virtual display corresponding to each of a plurality of remote computing devices on a local display surface;
   each virtual display being locally generated from screen images that are periodically captured from a display device of each remote computing device and transmitted by each corresponding remote computing device to the local display surface;
   providing a local user input mechanism for interacting with any of the virtual displays corresponding to any of the remote computing devices;
   monitoring interaction with any of the virtual displays and sending corresponding control events to the corresponding remote computing device; and
   interpreting the control events to provide input to the corresponding remote computing device in order to control the actions of the corresponding remote computing device.

2. The method of claim 1 wherein one or more of the screen images comprising any of the virtual displays are adaptively compressed.

3. The method of claim 2 wherein the adaptively compressed screen images are generated by omitting one or more blocks of pixels from screen images prior to transmission when those blocks are occluded by any of the other virtual displays on the local display surface.

4. The method of claim 2 wherein one or more of the remote computing devices transmits portions of the adaptively compressed screen images corresponding to a region of interest at a higher periodic rate than portions of the adaptively compressed screen images that are outside of the region of interest.

5. The method of claim 1 further comprising using the local user input mechanism for evaluating input received from one or more wearable sensors to convert user gestures into corresponding control events.

6. The method of claim 5 further comprising changing an appearance of the composite display by emulating visual effects and control actions corresponding to touch-screen type inputs in response to corresponding user gestures received from one or more of the wearable sensors.

7. The method of claim 5 wherein one or more of the wearable sensors includes a multi-axis accelerometer for receiving inputs corresponding to user finger motions, and wherein those finger motions are converted into control events corresponding to particular types of mouse events based on a plurality of finger motion acceleration profiles.

8. The method of claim 5 wherein two or more of the wearable sensors include multi-axis accelerometers for receiving inputs corresponding to user finger motions, and wherein those finger motions are converted into control events corresponding to particular types of pointer events based on a plurality of finger motion acceleration profiles to simulate a multi-touch interface for the local display surface.

9. The method of claim 8 wherein one or more of the wearable sensors including multi-axis accelerometers are worn on at least one finger of each of the users hands.

10. The method of claim 5 wherein one or more of the wearable sensors include wireless communications capabilities.

11. A computer-implemented process for adapting an arbitrary display surface into a thin client having a plurality of virtual interactive displays, comprising using one or more computing devices to perform process actions for:
   periodically receiving transmissions of separate screen images corresponding to each of a plurality of applications running on a plurality of remote heterogeneous computing devices;
   wherein each separate screen image is captured from a display device of a corresponding remote heterogeneous computing device prior to transmission of that screen image;
   locally generating separate virtual interactive displays from the received screen images of each corresponding application;
   locally constructing a composite interactive display from two or more of the separate virtual interactive displays and rendering the composite interactive display on a local display surface;
   providing a local user interface for interacting with any of the virtual interactive displays comprising the composite interactive display;
   monitoring inputs received via the local user interface and converting one or more of those inputs to corresponding control events; and
   providing the control events as inputs to the corresponding applications running on the corresponding remote heterogeneous computing devices.

12. The computer-implemented process of claim 11 wherein one or more of the separate screen images are adaptively compressed prior to transmission by omitting one or more blocks of pixels from those screen images when those blocks are occluded by any of the other virtual interactive displays.

13. The computer-implemented process of claim 11 wherein one or more regions of interest of one or more of the transmitted screen images are transmitted at a higher periodic rate than portions of those screen images that are outside of the region of interest.

14. The computer-implemented process of claim 11 wherein a plurality of the inputs converted to control events are provided to the local user interface via one or more wearable sensors.

15. The computer-implemented process of claim 14 further comprising changing an appearance of the composite interactive display by emulating visual effects and control actions corresponding to touch-screen type inputs in response to corresponding gesture-type inputs received from one or more of the wearable sensors.

16. A computer-readable storage device having computer executable instructions stored therein for providing virtual displays of a plurality of remote heterogeneous computing devices on a local display surface, said instructions causing a processor to execute operations comprising:

running one or more applications on each of a plurality of remote heterogeneous computing devices;

periodically capturing and compressing separate screen images from a display device of each of the remote heterogeneous computing devices;

periodically receiving transmissions of the compressed screen images from each of the corresponding remote heterogeneous computing devices;

applying the received compressed screen images for locally generating a composite display comprising a separate virtual display corresponding to each of the applications running on the remote heterogeneous computing devices;

rendering the composite display on a local display surface;

receiving user inputs for interacting with any of the virtual displays comprising the composite display; and converting the user inputs to corresponding control events and transmitting those control events as inputs to the corresponding applications running on corresponding remote heterogeneous computing devices.

17. The computer-readable storage device of claim 16 wherein the compressed screen images are adaptively generated prior to transmission by omitting one or more blocks of pixels from the compressed screen images when those blocks are occluded by any of the other virtual displays of the composite display.

18. The computer-readable storage device of claim 16 wherein portions of the compressed screen images corresponding to a region of interest are transmitted at a higher periodic rate than portions of the compressed screen images that are outside of the region of interest.

19. The computer-readable storage device of claim 16 generating visual effects on the rendered composite display to emulate corresponding touch-screen type inputs in response to user inputs received from one or more wearable sensors.

20. The computer-readable storage device of claim 16 wherein one or more of the wearable sensors includes a multi-axis accelerometer for receiving inputs corresponding to user finger motions.

* * * * *